(12) United States Patent
Gaw et al.

(10) Patent No.: US 9,776,467 B1
(45) Date of Patent: Oct. 3, 2017

(54) LEAF SPRING ROLL-DECOUPLING SYSTEM

(71) Applicant: GM GLOBAL TECHNOLOGY OPERATIONS LLC, Detroit, MI (US)

(72) Inventors: Sean P. Gaw, Troy, MI (US); Donald C. McWilliam, Clinton Twp., MI (US)

(73) Assignee: GM Global Technology Operations LLC, Detroit ( * ) Notice: Subject to any disclaimer, the term of this patent is extended or adjusted under 35 U.S.C. 154(b) by 0 days.

(21) Appl. No.: 15/416,770

(22) Filed: Jan. 26, 2017

(51) Int. Cl.
*B60G 11/10* (2006.01)
*B60G 17/02* (2006.01)

(52) U.S. Cl.
CPC ............ *B60G 17/023* (2013.01); *B60G 11/10* (2013.01)

(58) Field of Classification Search
CPC  B60G 17/023; B60G 11/10; B60G 2202/112; B60G 2204/121; B60G 11/113
See application file for complete search history.

(56) References Cited

U.S. PATENT DOCUMENTS

| | | | | |
|---|---|---|---|---|
| 1,387,615 A * | 8/1921 | Ritter | ..................... | B60G 11/10 267/42 |
| 1,408,005 A * | 2/1922 | Jones | ..................... | B60G 11/10 267/52 |
| 2,678,819 A * | 5/1954 | Douglass | .............. | B60G 11/113 267/52 |
| 2,931,642 A * | 4/1960 | Kucera | ................. | B60G 11/113 267/231 |
| 3,730,508 A * | 5/1973 | Marian | ................. | B60G 11/113 267/52 |
| 8,480,108 B2 * | 7/2013 | Ryshavy | ............... | B60G 11/10 280/124.175 |
| 2006/0255556 A1 * | 11/2006 | Reast | ..................... | B60G 11/12 280/124.17 |

* cited by examiner

*Primary Examiner* — Faye M Fleming

(57) ABSTRACT

A systems and apparatus to decouple an axle and a leaf spring of a vehicle are disclosed herein. In some embodiment, the apparatus includes a spacer block. The spacer block has a main body having an upper surface and two opposing side surfaces with an opening formed in each of the two opposing side surfaces of the main body to form a passage through the main body. The spacer block allows the leaf spring to rotate independent of the axle.

16 Claims, 4 Drawing Sheets

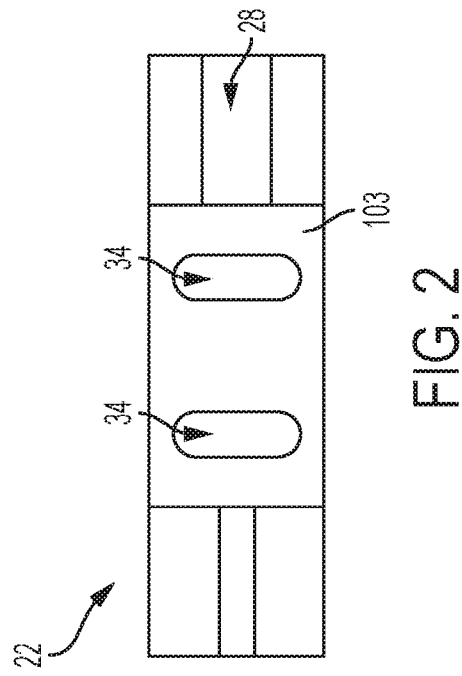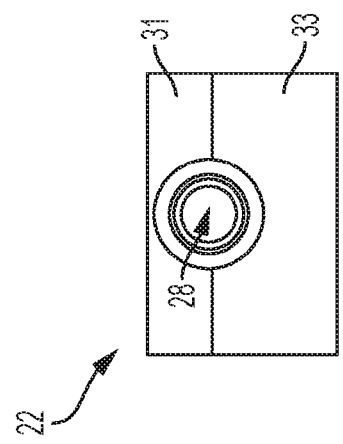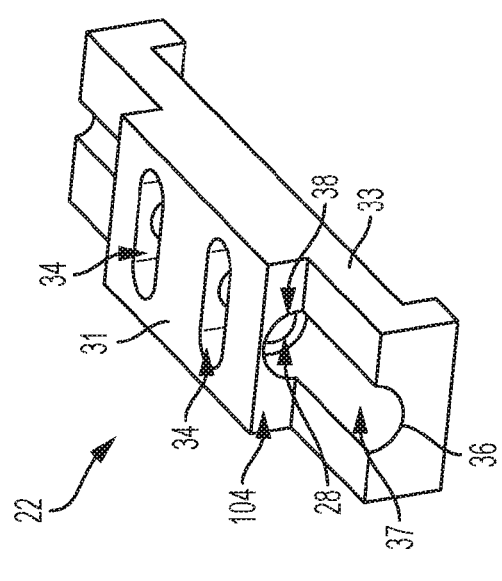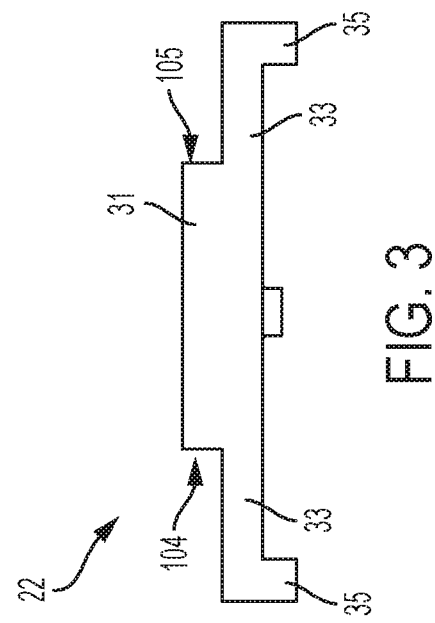

LEAF SPRING ROLL-DECOUPLING SYSTEM

INTRODUCTION

The present invention relates generally to the field of vehicles and, more specifically, to a system to decouple a leaf spring from an axle of a vehicle to provide movement in the case of vehicle roll.

To add additional height to a vehicle suspension, lift or spacer blocks may be installed between the leaf spring and the axle. Typical implementations rigidly affix the spacer block to the axle and to the leaf spring, allowing no degrees of freedom between the leaf spring and the axle.

SUMMARY

Embodiments according to the present disclosure provide a number of advantages. For example, embodiments of a roll-decouple joint according to the present disclosure reduce or eliminate leaf spring twist due to axle roll. Embodiments of a roll-decouple joint according to the present disclosure incorporate a means of decoupling the leaf spring from the axle roll motion while maintaining rigidity in the other five (5) degrees of freedom.

In an axle roll condition, the leaf spring is not twisted with the axle seat, but instead remains relatively flat in the X-Y plane while still articulating up and down in the Z direction. This reduces overall spring stresses, minimizing compound stresses. Additionally, embodiments according to the present invention reduce axle lateral shift due to spring twist during high roll events. Furthermore, embodiments according to the present disclosure enable larger roll angles (all else being equal) by removing spring resistance to twist angles.

In one aspect, an apparatus to decouple an axle and a leaf spring of a vehicle is disclosed. The apparatus includes a spacer block including a main body having an upper surface and two opposing side surfaces and at least one connection member. The spacer block is coupled to the axle and the at least one connection member is coupled to the spacer block and to the leaf spring such that the leaf spring has one degree of freedom of movement with respect to the axle.

In some aspects, the at least one connection member secures the leaf spring to the spacer block and allows the leaf spring to rotate with respect to the axle.

In some aspects, the main body further includes an opening formed in each of the two opposing side surfaces of the main body, the openings in the side surfaces forming a passage passing through the main body from one of the opposing side surfaces to the other of the opposing side surfaces, and at least one opening in the upper surface.

In some aspects, the apparatus further includes a rotational member inserted within the passage through the main body, wherein the at least one opening in the upper surface is configured to allow the at least one connection member to engage with the rotational member.

In some aspects, the spacer block further includes a first shoulder portion adjacent to one of the side surfaces and a second shoulder portion adjacent to the other of the side surfaces.

In some aspects, the at least one connection member has a threaded portion and an eye portion, wherein the eye portion is configured to engage with the rotational member.

In another aspect, a suspension system for an automotive vehicle is disclosed. The suspension system includes a leaf spring; an axle; a roll-decouple assembly including an axle spacer block including a main body having an upper surface, a first side surface, and a second side surface; and at least one connection member. The axle spacer block is coupled with the axle and the at least one connection member couples the leaf spring to the axle spacer block such that the leaf spring rotates independent of the axle.

In some aspects, the suspension system further includes a rotational member, wherein the rotational member is inserted in a passage through the main body, the passage passing through the main body from the first side surface to the second side surface.

In some aspects, the main body of the axle spacer block further includes at least one opening in the upper surface, the at least one opening configured to allow the at least one connection member to rotate relative to the axle spacer block.

In some aspects, the at least one connection member has a threaded portion and an eye portion, wherein the eye portion is configured to engage with the rotational member.

In some aspects, the axle spacer block is secured to the axle with at least one securing member.

In some aspects, the at least one securing member is a U-shaped bolt.

In yet another aspect, a roll-decouple system for a vehicle suspension is disclosed. The roll-decouple system includes a spacer block including a main body having an upper surface, a first side surface, and a second side surface, the upper surface defining a first length, a first passage extending through the main body, at least one opening passing through the upper surface of the main body, the at least one opening forming a second passage orthogonal to the first passage; and at least one connection member. The connection member extends through the second passage and the second passage is configured to allow the at least one connection member to rotate relative to the spacer block.

In some aspects, the roll decouple system further includes a rotational member inserted in the first passage wherein the second passage is configured to allow the at least one connection member to engage with the rotational member.

In some aspects, the at least one connection member has a threaded portion and an eye portion, wherein the eye portion is configured to engage with the rotational member.

In some aspects, the at least one connection member secures a vehicle leaf spring to the spacer block and allows the leaf spring to rotate with respect to a vehicle axle.

In some aspects, the spacer block is secured to the vehicle axle.

BRIEF DESCRIPTION OF THE DRAWINGS

The present disclosure will be described in conjunction with the following figures, wherein like numerals denote like elements.

FIG. 1 is a top perspective view of an axle spacer block for a leaf spring roll-decouple joint, according to an embodiment.

FIG. 2 is a top view of the spacer block of FIG. 1, according to an embodiment.

FIG. 3 is a front view of the spacer block of FIG. 1, according to an embodiment.

FIG. 4. is a side view of the spacer block of FIG. 1, according to an embodiment.

Figure 5:
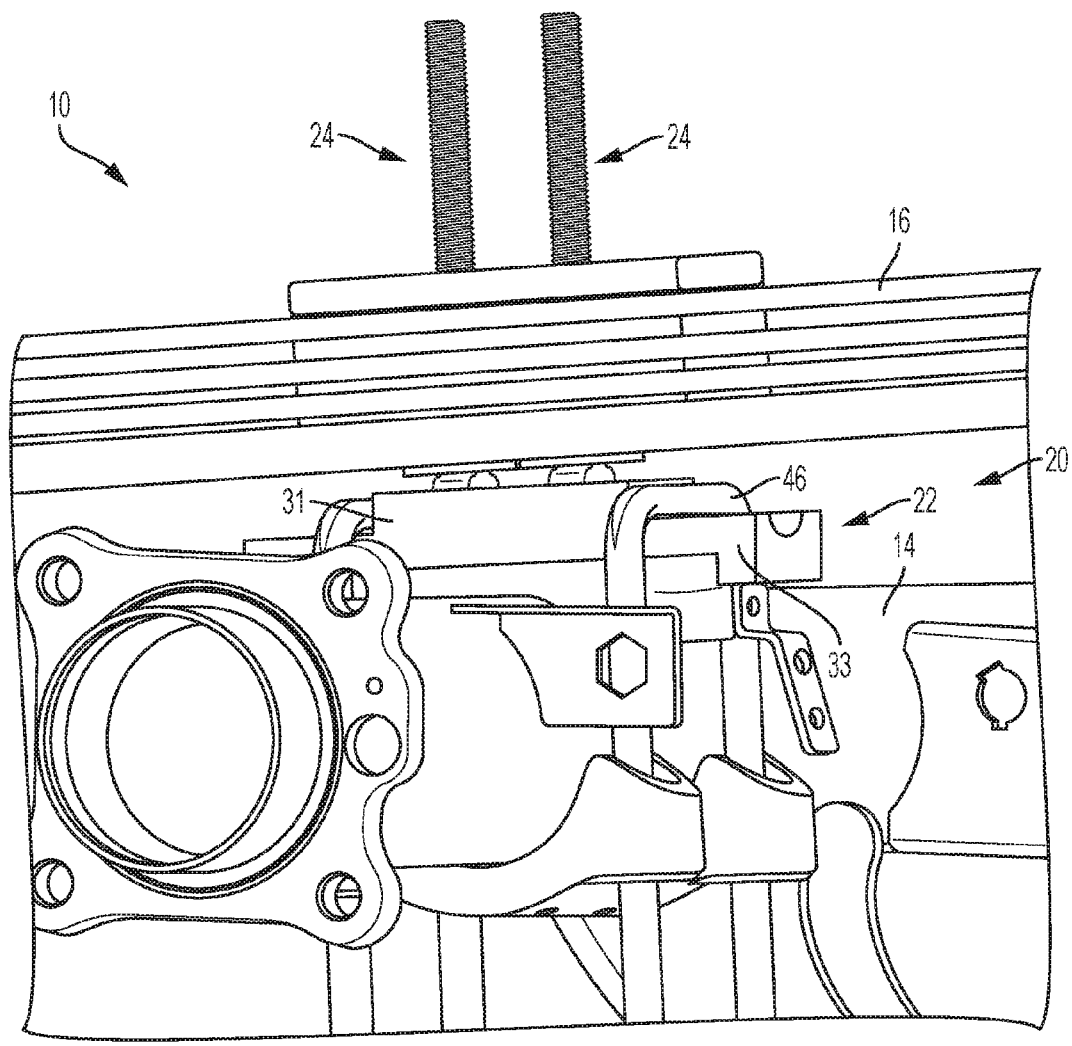
FIG. 5. is a perspective view of an axle and leaf spring assembly including the roll-decouple joint axle spacer block of FIG. 1, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The suspension system of a vehicle includes, in some embodiments, a leaf spring connected to an axle. The leaf spring may be connected to the axle via a spacer block that does not permit relative motion between the leaf spring and the axle. However, during an axle roll event, the leaf spring can twist or deform, possibly causing damage to the leaf spring or other suspension components.

FIGS. 1-4 illustrate an axle spacer block 22 for a roll-decouple joint assembly that reduces or eliminates leaf spring twist due to axle roll, according to an embodiment. In some embodiments, the spacer block 22 includes a main body 31 and two shoulder portions 33 located longitudinally on either side of the main body 31. In some embodiments, each of the shoulder portions 33 includes a flange 35. Each of the flanges 35 is orthogonal to the longitudinal axis defined by the shoulder portions 33 of the spacer block 22. The main body 31 includes an upper surface 103 and two opposing side surfaces 104, 105.

With continued reference to FIGS. 1 and 4, the main body 31 of the spacer block 22 includes a passage 28 defined by a circular edge 38. The passage 28 passes longitudinally through the main body 31. The openings defining the passage 28 are formed in the two opposing side surfaces 104, 105. In some embodiments, the passage 28 is roughly circular through the main body 31 of the spacer block 22. In some embodiments, the passage 28 extends longitudinally across the entire length of the spacer block 22 as an open channel. For example, in some embodiments, a channel 37 defined by a channel surface 36 extends longitudinally through each shoulder portion 33, as shown in FIG. 1.

With reference to FIGS. 1 and 2, in some embodiments, the spacer block 22 includes a plurality of openings 34 (two shown) in an upper surface 103 of the main body 31. In some embodiments, the passage 28 accommodates a rotational member or pin. The rotational member is inserted within the passage 28 through the main body 31 and the rotational member is accessible from outside the main body 31 via the plurality of openings 34 in the upper surface 103. As discussed in greater detail below, in some embodiments, the pin interfaces with one or more fasteners to allow one degree of freedom relative motion between the leaf spring of the vehicle and the spacer block connected to the axle.

FIG. 5 illustrates an axle and leaf spring assembly 10 according to an embodiment. The axle and leaf spring assembly 10 includes an axle 14, a leaf spring 16, and a roll-decouple joint assembly 20 separating the axle 14 and the leaf spring 16.

The roll-decouple joint assembly 20 includes the spacer block 22, at least one connection member or fastener to connect the spacer block to the axle, and at least one securing member or fastener to connect the leaf spring to the spacer block. In some embodiments, the spacer block 22 is connected to the axle 14 with one or more securing members such as U-bolts 46. In some embodiments, one or more connection members or fasteners 24 connect the leaf spring 16 to the spacer block 22. In some embodiments, the fasteners 24 are shouldered rod ends having a threaded portion 25 and an eye portion 26, such as, for example and without limitation, those shown in FIG. 8. In some embodiments, the spacer block 22 of the roll-decouple joint assembly 20 also includes one or more openings in the upper surface of the main body. In some embodiments, the openings allow the fasteners 24 to rotate about a pin that passes longitudinally through the main body 31 of the spacer block 22, as discussed in greater detail below. In some embodiments, the fasteners 24 are ball joints or other rotation-enabling fasteners embedded or pressed into the spacer block 22 to rotationally connect the leaf spring 16 to the spacer block 22. In embodiments including one or more ball joints, the ball joints are pressed into the spacer block 22 in the one or more openings in the upper surface of the main body.

Figure 7:
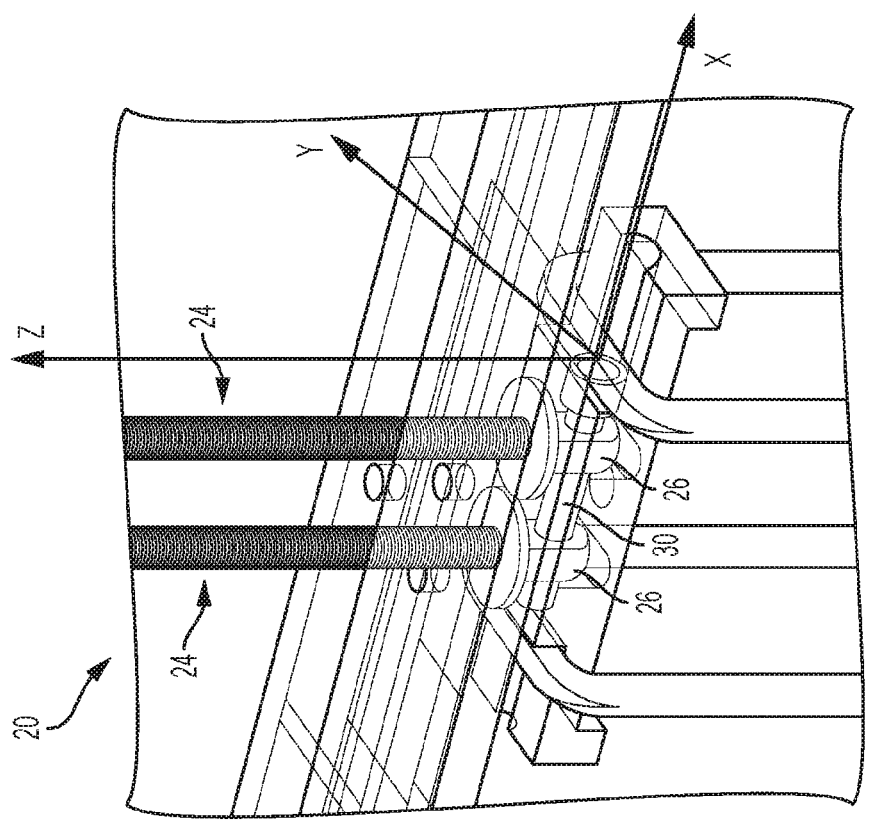
FIG. 7 is a perspective view of the roll-decouple joint axle spacer block of FIG. 6 (shown in phantom) coupled to a leaf spring (also shown in phantom), according to an embodiment.
Figure 6:
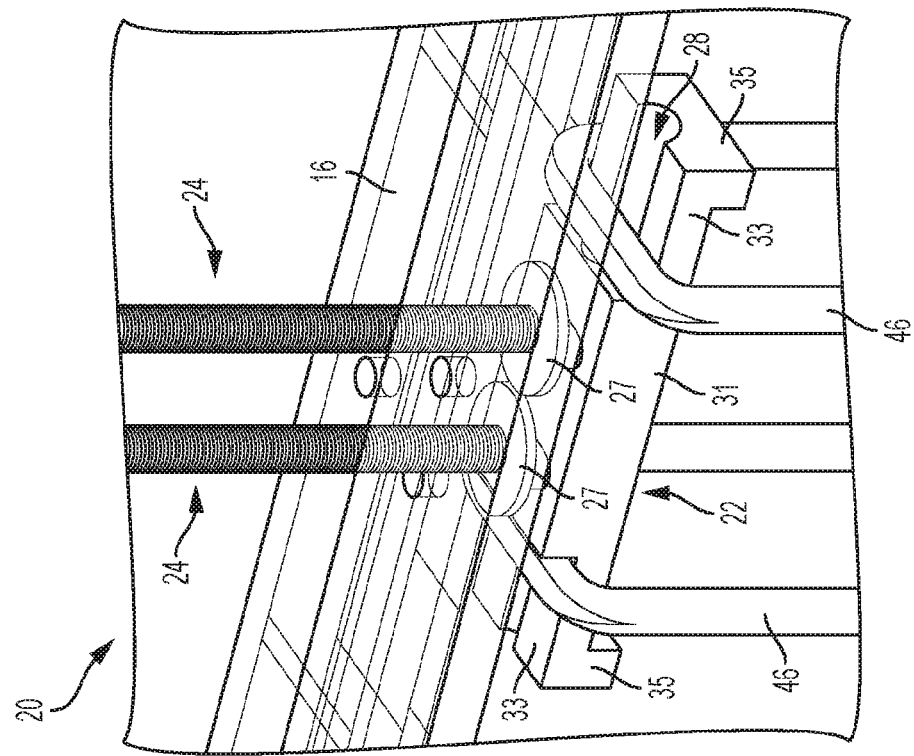
FIG. 6. is a perspective view of a roll-decouple joint axle spacer block coupled to a leaf spring (shown in phantom), according to an embodiment.

The roll-decouple system 20 permits one degree of freedom movement between the leaf spring 16 and the axle 14 while restricting or preventing movement in other directions. As shown in FIGS. 6 and 7, in some embodiments, the roll decouple joint assembly 20 includes a pin 30 that extends through the passage 28 in the spacer block 22. Fasteners 24 extend through openings on the upper surface of the main body 31 of the spacer block 22. In some embodiments, the fasteners 24, such as the fasteners 24 shown in FIG. 8, connect the leaf spring 16 to the spacer block 22 via the pin 30. The eye portion 26 of the fasteners 24 is configured to engage with the rotational member such that the fastener 24, and thereby, the leaf spring 16, rotate about the spacer block 22 and the axle 14. In some embodiments, such as the embodiment shown in FIGS. 6 and 7, the eye portion 26 encircles the pin 30 to allow the leaf spring 16 to rotate about the spacer block 22 and the axle 14. The size and shape of the openings 34 determines the degree of rotation of the leaf spring 16. In some embodiments, the fasteners 24 are permitted to travel an arc of approximately 15 degrees or approximately 20 degrees. In some embodiments, the fasteners 24 travel an arc of up to approximately 20 degrees. In some embodiments, washers 27 are placed on the fasteners 24 such that the washers 27 are between the leaf spring 16 and the upper surface 103 of the spacer block main body 31. While fasteners including a shouldered rod end or a ball joint are discussed herein, any fastener known to those of skill in the art that allows one degree of freedom rotation of the leaf spring 16 with respect to the spacer block 22 and the axle 14 may be used.

As discussed above, the spacer block 22 includes a plurality of openings 34 (two shown) in the upper surface of the main body 31. In some embodiments, the openings 34 permit the eye portions 26 of the fasteners 24 to interface with the pin 30. The openings 34 also limit the arc of rotation of the fasteners 24. As part of the roll decouple joint assembly 20, the pinned connection between the fasteners 24 and the pin 30 allow the leaf spring 16 to articulate up and down in the Z-direction while remaining relatively flat in the X-Y plane during an axle roll condition.

Figure 8:
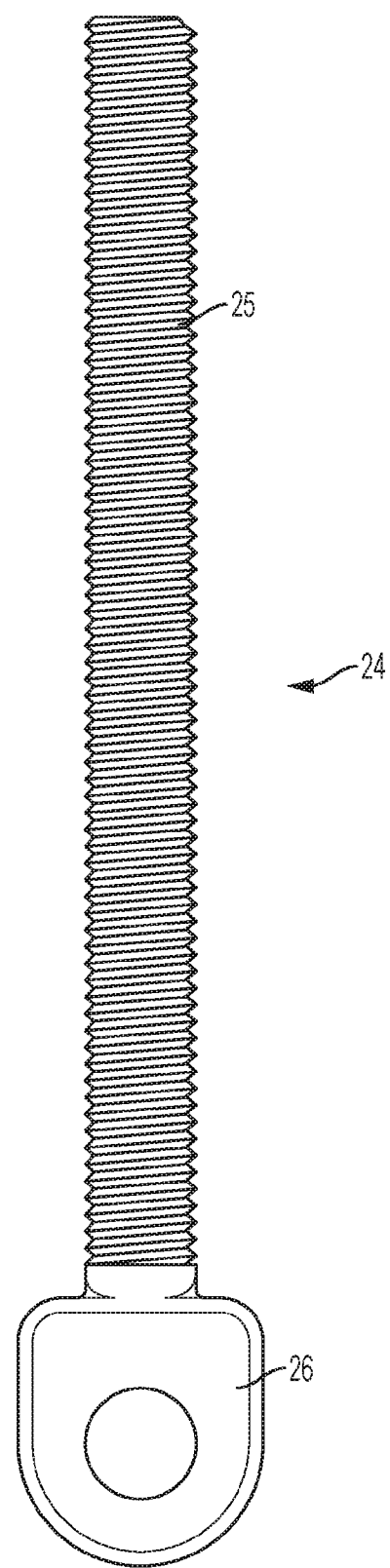
FIG. 8 is an embodiment of a threaded fastener that may be used as part of a roll-decouple joint, according to an embodiment.

With reference to FIG. 7, the openings 34 permit the fasteners 24 shown in FIG. 8 to rotate about the axis defined by the pin 30 within the passage 28 (that is, about the X axis shown in FIG. 7), but do not permit the fasteners 24 to translate along either the Y or Z axes. The pin 30 is secured within passage 28 of the main body 31 of the spacer block 22.

In embodiments wherein a fastener such as a ball joint is used to connect the leaf spring 16 with the spacer block 22, the pressed-fit connection between the fastener and the spacer block 22 allows the leaf spring 16 to articulate up and down in the Z-direction while the leaf spring 16 remains relatively flat in the X-Y plane during an axle roll condition.

In an axle roll event, the leaf spring does not twist with the axle, but instead remains relatively flat in the X-Y plane. The roll-decouple joint 20 permits the leaf spring to articulate up and down in the Z direction. The roll-decouple joint 20 decouples the leaf spring 16 from axle roll motion while maintaining rigidity in the other five (5) degrees of freedom (longitudinal, lateral, Z-axis translation, axle rotation about the Y-axis, and axle rotation about the Z-axis).

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An apparatus to decouple an axle and a leaf spring of a vehicle, comprising:
    a spacer block including a main body having an upper surface having at least one opening, two opposing side surfaces, and an opening formed in each of the two opposing side surfaces defining a passage through the main body from one of the opposing side surfaces to the other of the opposing side surfaces; and
    at least one connection member;
    wherein the spacer block is coupled to the axle and the at least one connection member is coupled to the spacer block and to the leaf spring such that the leaf spring has one degree of freedom of movement with respect to the axle.

2. The apparatus of claim 1, wherein the at least one connection member secures the leaf spring to the spacer block and allows the leaf spring to rotate with respect to the axle.

3. The apparatus of claim 2 further comprising a rotational member inserted within the passage through the main body, wherein the at least one opening in the upper surface is configured to allow the at least one connection member to engage with the rotational member.

4. The apparatus of claim 2, wherein the spacer block further comprises a first shoulder portion adjacent to one of the side surfaces and a second shoulder portion adjacent to the other of the side surfaces.

5. The apparatus of claim 3, wherein the at least one connection member has a threaded portion and an eye portion, wherein the eye portion is configured to engage with the rotational member.

6. A suspension system for an automotive vehicle, comprising:
    a leaf spring;
    an axle;
    a roll-decouple assembly comprising
        an axle spacer block including a main body having an upper surface, a first side surface, and a second side surface and a passage passing through the main body from the first side surface to the second side surface; and
        at least one connection member;
    wherein the axle spacer block is coupled with the axle and the at least one connection member couples the leaf spring to the axle spacer block such that the leaf spring rotates independent of the axle.

7. The suspension system of claim 6 further comprising a rotational member, wherein the rotational member is inserted in the passage through the main body.

8. The suspension system of claim 6, wherein the main body of the axle spacer block further comprises at least one opening in the upper surface, the at least one opening configured to allow the at least one connection member to rotate relative to the axle spacer block.

9. The suspension system of claim 7, wherein the at least one connection member has a threaded portion and an eye portion, wherein the eye portion is configured to engage with the rotational member.

10. The suspension system of claim 6, wherein the axle spacer block is secured to the axle with at least one securing member.

11. The suspension system of claim 10, wherein the at least one securing member is a U-shaped bolt.

12. A roll-decouple system for a vehicle suspension, comprising:
    a spacer block including a main body having an upper surface, a first side surface, and a second side surface, the upper surface defining a first length, a first passage extending through the main body, at least one opening passing through the upper surface of the main body, the at least one opening forming a second passage orthogonal to the first passage; and
    at least one connection member;
    wherein the connection member extends through the second passage and the second passage is configured to allow the at least one connection member to rotate relative to the spacer block.

13. The roll decouple system of claim 12 further comprising a rotational member inserted in the first passage wherein the second passage is configured to allow the at least one connection member to engage with the rotational member.

14. The roll decouple system of claim 13, wherein the at least one connection member has a threaded portion and an eye portion, wherein the eye portion is configured to engage with the rotational member.

15. The roll decouple system of claim 13, wherein the at least one connection member secures a vehicle leaf spring to the spacer block and allows the leaf spring to rotate with respect to a vehicle axle.

16. The roll decouple system of claim 15, wherein the spacer block is secured to the vehicle axle.

* * * * *